(12) United States Patent
Zhu et al.

(10) Patent No.: US 12,730,218 B2
(45) **Date of Patent: *Sep. 8, 2026**

(54) METHOD AND SYSTEM FOR ULTRASOUND TIME-OF-FLIGHT MEASUREMENT

(71) Applicant: TEXAS INSTRUMENTS INCORPORATED, Dallas, TX (US)

(72) Inventors: Yuming Zhu, Plano, TX (US); Srinath Ramaswamy, Murphy, TX (US); Domingo Garcia, Plano, TX (US); Sujeet Milind Patole, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/367,383

(22) Filed: Jul. 4, 2021

(65) Prior Publication Data

US 2021/0333390 A1 Oct. 28, 2021

Related U.S. Application Data

(63) Continuation of application No. 15/225,134, filed on Aug. 1, 2016, now Pat. No. 11,054,520.

(Continued)

(51) Int. Cl.

*G01S 15/10* (2006.01)
*G01N 29/07* (2006.01)

(Continued)

(52) U.S. Cl.

CPC .............. *G01S 15/10* (2013.01); *G01N 29/07* (2013.01); *G01N 29/075* (2013.01); *G01N 29/11* (2013.01);

(Continued)

(58) Field of Classification Search

None

See application file for complete search history.

(56) References Cited

U.S. PATENT DOCUMENTS 3,237,150 A 2/1966 Beck
3,495,242 A 2/1970 Dickey, Jr.

(Continued)

FOREIGN PATENT DOCUMENTS

JP 2004150825 A * 5/2004

OTHER PUBLICATIONS

Khyam, Md Omar, et al. "Highly accurate time-of-flight measurement technique based on phase-correlation for ultrasonic ranging." IEEE sensors journal 17.2 (2016): 434-443. (Year: 2016).*

(Continued)

*Primary Examiner* — Jonathan D Armstrong

(74) *Attorney, Agent, or Firm* — Zhenhai Fu; Frank D. Cimino

(57) ABSTRACT

A transducer system with transducer and circuitry for applying a pulse train at a single frequency to excite the transducer. The transducer is operable to receive an echo waveform in response to the pulse train. The system also comprises circuitry for determining a time of flight as between a first reference time associated with the pulse train and a second reference time associated with the echo waveform.

26 Claims, 5 Drawing Sheets

Related U.S. Application Data

(60) Provisional application No. 62/205,821, filed on Aug. 17, 2015.

(51) Int. Cl.
*G01N 29/11* (2006.01)
*G01N 29/12* (2006.01)
*G01N 29/14* (2006.01)
*G01S 7/539* (2006.01)
*G01S 15/00* (2020.01)
*G01S 15/58* (2006.01)

(52) U.S. Cl.
CPC ............. *G01N 29/12* (2013.01); *G01N 29/14* (2013.01); *G01S 7/539* (2013.01); *G01S 15/582* (2013.01); *G01N 2291/011* (2013.01); *G01N 2291/014* (2013.01); *G01N 2291/0258* (2013.01); *G01S 15/003* (2013.01)

(56) References Cited

U.S. PATENT DOCUMENTS 4,196,650 A 4/1980 Fricke
4,819,649 A 4/1989 Rogers
4,837,578 A 6/1989 Gammell
4,847,817 A 7/1989 Au
4,849,741 A 7/1989 Thomas
4,922,467 A 5/1990 Caulfield
5,117,698 A 6/1992 Baumoel
5,325,130 A 6/1994 Miller et al.
5,383,462 A 1/1995 Hall
5,418,758 A * 5/1995 Webster .................. G01S 15/08 367/101
5,672,825 A 9/1997 Uno
5,867,125 A 2/1999 Cluff
5,920,520 A 7/1999 Gallagher
5,924,991 A 7/1999 Hossack et al.
5,974,881 A 11/1999 Donskoy
6,023,976 A 2/2000 Borza
6,104,671 A 8/2000 Hoyt
6,109,112 A 8/2000 Borza
6,137,842 A 10/2000 Grossnickle
6,402,704 B1 6/2002 McMorrow
6,561,031 B2 5/2003 Borza
6,728,645 B1 4/2004 Kozlov
7,073,384 B1 7/2006 Donskoy
7,092,965 B2 8/2006 Easwar
7,397,427 B1 7/2008 Rhoads et al.
7,513,160 B2 4/2009 Lynch et al.
7,543,508 B2 6/2009 Lang
7,701,380 B2 4/2010 Altes
9,043,182 B2 5/2015 Seo
9,057,682 B2 6/2015 Nakayama
9,400,239 B2 7/2016 Lemaster
9,506,896 B2 11/2016 Hwang
2002/0055680 A1* 5/2002 Miele ....................... A61B 8/04 600/450
2003/0035342 A1* 2/2003 Harrington ........... G01S 15/102 367/127
2004/0135992 A1 7/2004 Munro
2008/0062151 A1 3/2008 Kent
2008/0300805 A1 12/2008 Li
2010/0117993 A1 5/2010 Kent
2010/0235137 A1 9/2010 Seo
2010/0324418 A1* 12/2010 El-Aklouk ............ G01S 7/5208 600/459
2011/0066390 A1 3/2011 Macleod
2011/0137588 A1 6/2011 Walker
2011/0261652 A1 10/2011 Horsky
2011/0288801 A1* 11/2011 Buccafusca ............. G01S 7/285 702/77
2012/0021873 A1 1/2012 Brunner
2012/0172744 A1 7/2012 Kato
2013/0054603 A1 2/2013 Birdwell
2013/0190584 A1 7/2013 Walker
2013/0293586 A1 11/2013 Kaino
2013/0336093 A1 12/2013 Suvanto
2013/0345937 A1 12/2013 Strelioff
2014/0367401 A1 12/2014 Strålin
2014/0378820 A1 12/2014 Gururaj
2015/0107361 A1 4/2015 Pirkle
2015/0130100 A1 5/2015 Fiegener
2015/0140534 A1 5/2015 Brunner
2015/0173652 A1 6/2015 Brunner
2015/0276683 A1 10/2015 Bamberg
2015/0330950 A1 11/2015 Bechhoefer
2016/0061597 A1 3/2016 De Bruijn
2016/0071336 A1 3/2016 Owen
2016/0085725 A1 3/2016 Léonard
2016/0178392 A1 6/2016 Goldfain
2016/0178748 A1 6/2016 Shin
2016/0231153 A1 8/2016 Rezanezhad Gatabi
2017/0052148 A1 2/2017 Estevez et al.
2017/0059704 A1 3/2017 Xie
2017/0090599 A1 3/2017 Kuboyama
2018/0074022 A1 3/2018 Huang
2018/0074025 A1* 3/2018 Estevez ................ G01N 29/075
2021/0123828 A1 4/2021 Sinharay

OTHER PUBLICATIONS

Webster, David. "A pulsed ultrasonic distance measurement system based upon phase digitizing." IEEE transactions on instrumentation and measurement 43.4 (1994): 578-582. (Year: 1994).*

Chu, David. "Phase digitizing sharpens timing measurements." IEEE spectrum 25.7 (1988): 28-32. (Year: 1988).*

Angrisani, Leopoldo and R. Schiano Lo Moriello; "Estimating ultrasonic time-of flight through quadrature demodulation"; IEEE transactions on instrumentation and measurement; 55.1 (2006); 54-62 (Year 2006).

Guyomar, Daniel, et al.; "A self-synchronizing and low-cost structural health monitoring scheme based on zero crossing detection"; Smart Materials and Structures & nbsp; 19.4 (2010); 045017 (Year 2010).

Beastie; "15 Auld Lang Sine"; https://web.archive.org/web/20100610092857://beastie.cs.ua.edu/sway/tcop/book_16.html (2010); (Year 2010).

Anderson, "Practical Techniques for Utilizing Ultrasonic Technology to Complement Vibration Analysis," P/PM Technology, vol. 14, Issue 1, Feb. 2001 (4 pages).

Digi-Key Electronics, "Slam Stick Vibration Recorder," 1995-2015, retrieved from <http://www.digikey.com/us/en/ph/mide/slamstick.html?WT.z_Tab_Cat=F . . . >, retrieved on Nov. 2, 2015 (1 page).

GTI Predictive Technology, "Ultrasonic Sensor for iPad—For Leak Detection and Testing Bearing Lubrication Overview," 2015, retrieved from <http://gtipredictive.com/ultrasonic/ . . . >, retrieved on Nov. 2, 2015 (1 page).

* cited by examiner

METHOD AND SYSTEM FOR ULTRASOUND TIME-OF-FLIGHT MEASUREMENT

CROSS-REFERENCES TO RELATED APPLICATIONS

This application is a continuation of U.S. patent application Ser. No. 15/225,134, filed Aug. 1, 2016, which claims priority to and the benefit of the filing date of U.S. Provisional Patent Application No. 62/205,821, filed Aug. 17, 2015, each of which is incorporated by reference herein in its entirety.

STATEMENT REGARDING FEDERALLY SPONSORED RESEARCH OR DEVELOPMENT

Not Applicable.

BACKGROUND OF THE INVENTION

The preferred embodiments relate to ultrasonic transducers and more particularly to a method and system for ultrasound time of flight (TOF) measurement.

Ultrasound transducers are known in the art for transmitting ultrasound waves and detecting a reflection or echo of the transmitted wave. Such devices are also sometimes referred to as ultrasound or ultrasonic transducers or transceivers. Ultrasound transducers have myriad uses that produce an output or other result based on a distance determination from the operation of the transceiver, whereby the transceiver emits a series of pulses toward a target and then receives back an echo waveform of the signal off the target, and signal processing determines a distance to the target based in part on the elapsed timing between the transmitted pulses and the echo waveform. The output of such a system may be the distance determination itself, or the distance determination may be part of an additional determination or action based on the distance, such as displacement measurement, level sensing, material characterization, structure monitoring, vibration sensing, medical diagnostics, and the like. In any event, for various of these applications, precision of the distance measurement may be very important.

By way of further background, FIG. 1 illustrates a signal diagram of the operation of a typical prior art ultrasound transducer, in first transmitting a signal and then receiving an echo waveform. Specifically, at a time $t_0$, an excitation pulse train is applied to the transducer, which in response transmits a corresponding ultrasonic pulse train signal, where both the applied and transmitted pulse trains consist of a number of pulses, such as 5 to 20 such pulses, shown beginning therefore at time $t_0$ and ending at time $t_1$. The transmitted pulses are directed toward a target item, which reflects a signal back toward the transducer. Time passes as these signals pass along a channel or medium between the transducer and the target. This time may be referred to in the art as time of flight (TOF) and therefore occurs between times $t_0$ and $t_2$. Note also that TOF may be measured as between offset times from either or both of times $t_0$ and $t_2$. For example, rather than TOF starting at $t_0$ when the pulse train commences, it may be started later, such as when the pulse train completes. Similarly, rather than TOF ending at $t_2$ when the echo waveform commences, it may be ended later, such as when the echo waveform reaches a threshold. Additional details as to the latter are described later in this document.

At time $t_2$, the transducer begins to receive back an echo waveform $WF_1$ signal, reflected by the target, as shown by the echo waveform that begins at time $t_2$. Echo waveform $WF_1$ is generally a sinusoid that starts at or near time $t_2$ with a relatively low amplitude and then the amplitude continues to increase for some amount of time. While not shown in FIG. 1, the waveform $WF_1$ (and amplitude) will eventually decay, although for sake of the teachings in this document the decay period is not of particular relevance as signal processing relies instead on the increasing amplitude period of the echo waveform $WF_1$. Specifically, processing circuitry (e.g., a processor), associated with or coupled to the transducer, is operable to sample this received waveform $WF_1$ so as to develop a time reference from $t_0$ to a detected point in the waveform. This detected point is also sometimes referred to as TOF, although it occurs in the echo waveform after $t_2$. Further, by detecting a certain time event in the waveform, a reference is created in one pulse repetition cycle (PRC), that is, in one instance of a pulse train followed by an echo waveform, so that this reference may be compared against a similar time reference in subsequent PRCs, whereby a change in reference thereby indicates a change in distance between the transducer and the target. In any event, there are various prior art approaches for detecting this time event in the echo waveform.

FIG. 2 illustrates a signal diagram in connection with explaining one prior art approach for detecting a time reference in a received echo waveform. First in connection with FIG. 2, note that the echo waveform of FIG. 1 is received, and it is applied to a rectifier so that any negative portion of the signal is thereby converted to a positive signal, so that the entire sinusoid is at or above zero amplitude. Moreover, per one prior art approach, the waveform time reference for a PRC is determined once the amplitude (or magnitude, if not rectified) reaches a threshold THR. Thus, as shown in FIG. 2, this occurs at what is shown as a first TOF at $t_{OF1}$, that is, where the waveform amplitude reaches THR. In this approach, therefore, the first TOF at $t_{OF1}$ becomes a first reference that may be compared to the reference TOF for comparably-performed time detections for subsequent (or earlier) PRCs.

FIG. 3 illustrates a signal diagram in connection with explaining another prior art approach for detecting a time reference in a received echo waveform $WF_1$, and for sake of contrast the first TOF at $t_{OF1}$ from FIG. 2 is also copied into FIG. 3. In FIG. 3, an envelope detector is also used to process the echo waveform, thereby creating an envelope $ENV_1$ signal or measure, as shown by an additional dashed line in FIG. 3. Moreover, per this prior art approach, the waveform time reference for a PRC is determined once the envelope reaches the threshold THR. Thus, in FIG. 3, this occurs at what is shown as a TOF at $t_{OF2}$, that is, where the waveform envelope $ENV_1$ reaches THR. Note, however, that the envelope reaches the threshold THR at $t_{OF2}$, which is before the actual increasing amplitude of the echo waveform does so at $t_{OF1}$. Thus, the envelope $ENV_1$ has a smoothing and interpolating function as between the successive increasing amplitude signal swings of the waveform so as to give a better approximation of when the energy of the waveform exceeds the threshold THR, and may provide better detection thereof, as compared to the approach of FIG. 2.

While the envelope approach of FIG. 3 performs better than the amplitude approach of FIG. 2, FIG. 4 illustrates a limitation of the envelope approach. Specifically, FIG. 4 includes the same waveform $WF_1$ (and its envelope $ENV_1$) of FIGS. 1 and 3, but to make the illustration clear that waveform is shown in a dashed line. Particularly, FIG. 4 also illustrates a second waveform $WF_2$ intending to depict the echo waveform from a second set of transmitted pulses (i.e., a second PRC). As shown in FIG. 4, therefore, the second waveform $WF_2$ has a slightly increased amplitude, as compared to the first waveform $WF_1$. Such a response may be received due to noise or the shape or size of the target. With the increase in amplitude in the second waveform $WF_2$, then its envelope $ENV_2$ necessarily increases in value at a faster rate than that of the envelope $ENV_1$ of the first waveform $WF_1$. Thus, note in FIG. 4 that the time when the envelope $ENV_2$ crosses the threshold THR occurs at $t_{OF4}$, which is earlier than the $t_{OF2}$ time that envelope $ENV_1$ (of waveform $WF_1$) crossed that threshold. Note that such a change in detected timing, therefore, can create erroneous results in the distance measure of the transducer system. Specifically, even if the target did not move from the time of the first PRC to the time of the second PRC, the system detects a change in TOF (i.e., between $t_{OF4}$ and $t_{OF2}$), which is thereby interpreted as a change in distance as between the PRCs. Thus, the noise or other cause in the amplitude variations between successive PRCs creates error in the distance measure.

Given the preceding, the preferred embodiments seek to improve upon the prior art, as further detailed below.

BRIEF SUMMARY OF THE INVENTION

In a preferred embodiment, there is a transducer system. The system comprises a transducer and circuitry for applying a pulse train at a single frequency to excite the transducer. The transducer is operable to receive an echo waveform in response to the pulse train. The system also comprises circuitry for determining a time of flight as between a first reference time associated with the pulse train and a second reference time associated with the echo waveform. The circuitry for determining comprises: (i) circuitry for estimating an amplitude waveform envelope for at least a portion of the echo waveform; (ii) circuitry for identifying a first time when the amplitude waveform envelope reaches a threshold; and (iii) circuitry for adjusting the first time to the second reference time, in response to a phase of the echo waveform.

Numerous other inventive aspects are also disclosed and claimed.

DETAILED DESCRIPTION OF EMBODIMENTS

FIGS. 1 through 4 were described in the earlier Background of the Invention section of this document and the reader is assumed to be familiar with the principles of that discussion.

Figure 5:
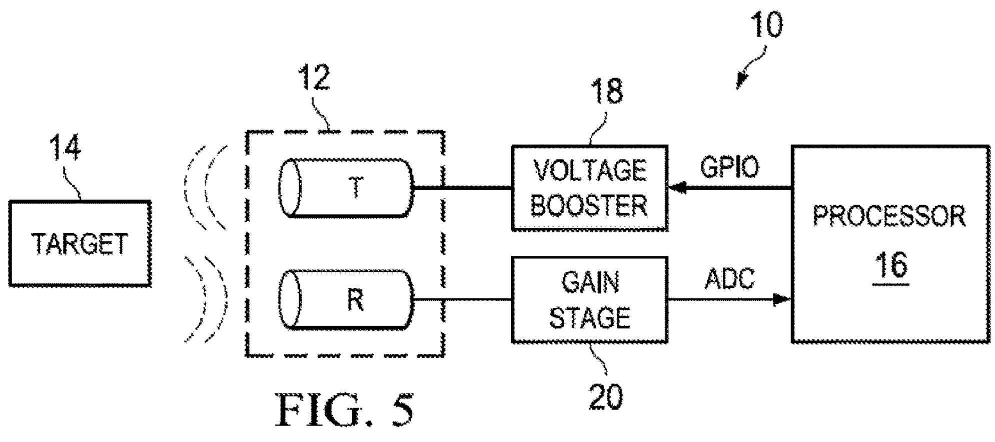
FIG. 5 illustrates a block diagram of a transducer 10 according to a preferred embodiment.

FIG. 5 illustrates a block diagram of transducer system 10 according to a preferred embodiment. System 10 includes an ultrasonic transducer 12 that for illustrative purposes is shown having a transmitting T and receiving R element, where those elements may be combined as known in the art. Transducer 12 is constructed of known (e.g., piezoelectric) materials and is operable to transmit ultrasound waves toward a target 14 and receives an echo waveform in response to reflections of the transmitted signal. More specifically, a processor 16 is coupled (e.g., via general purpose input/output GPIO) to an optional voltage booster 18, whereby processor 16 can output a pulse width modulated pulse train that is thereby voltage boosted and applied to the transmitting element T of transducer 12. The voltage boosted and pulsing input signal causes vibrations in the material of the transmitting element T of transducer 12, thereby emitting a typically directional wave signal toward target 14. When an echo waveform is reflected back to the receiving element R of transducer 12, that receiving element R responds with an electrical signal corresponding to the echo waveform. In system 10, the echo waveform is applied to a gain stage 20, which in a preferred embodiment amplifies the signal and also performs an analog-to-digital (ADC) conversion. The resultant digital signal is then connected to processor 16, which samples the digital signal at some desired sampling frequency, $f_S$, and processor 16 is further programmed to perform additional processing of the digital samples as detailed in the remainder of this document. Among such processing, processor 16 is able to determine an indication of time of flight (TOF) between the transmitted pulse signal and the received echo waveform (or a reference point in that waveform), thereby representing a distance between transducer 12 and target 14, where that distance may be the desired output from processor 16 or may be further processed in connection with other common transducer applications which process the distance measure further for additional determinations.

Figure 1:
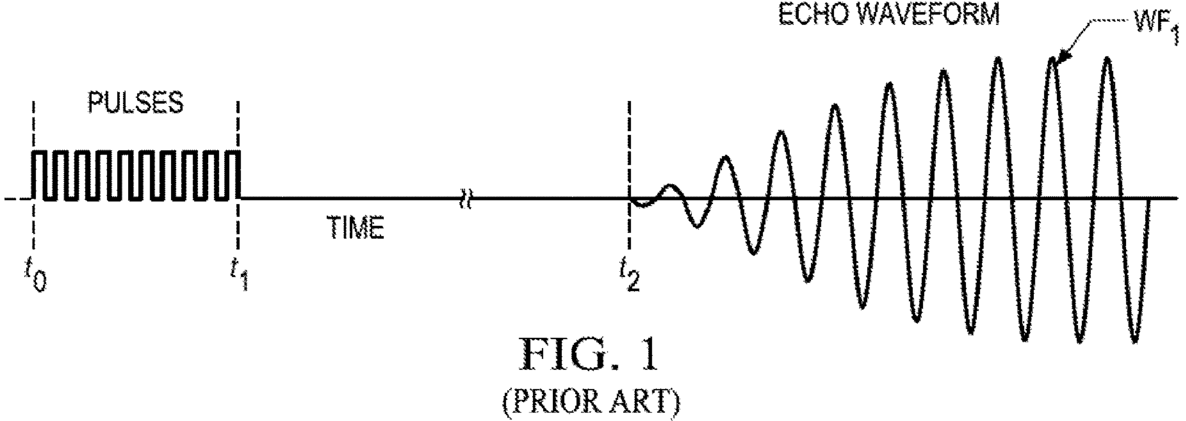
FIG. 1 illustrates a signal diagram of the operation of a typical prior art ultrasound transducer, in first transmitting a signal and then receiving an echo waveform.
Figure 2:
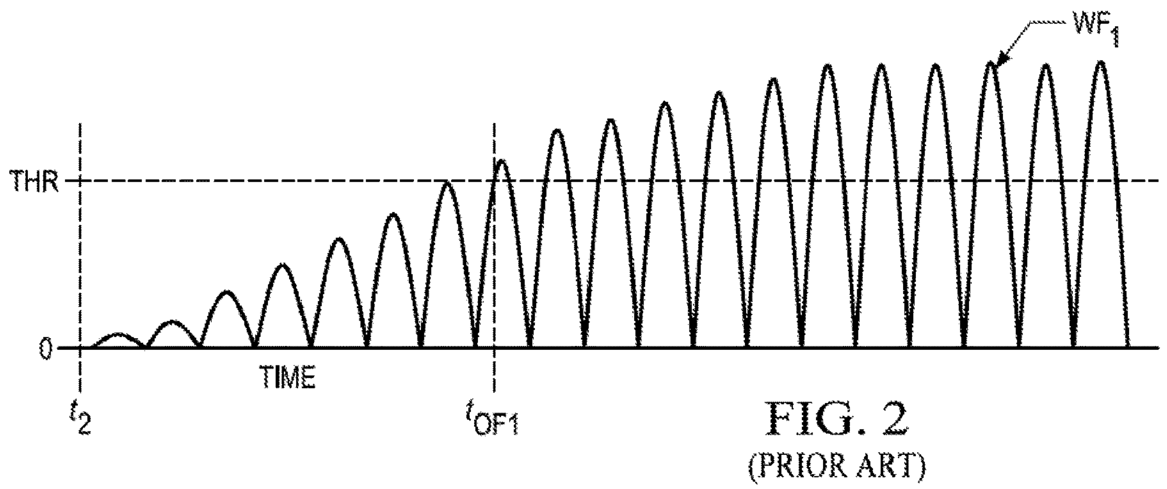
FIG. 2 illustrates a prior art received rectified echo waveform evaluated for when the signal amplitude reaches a threshold.
Figure 3:
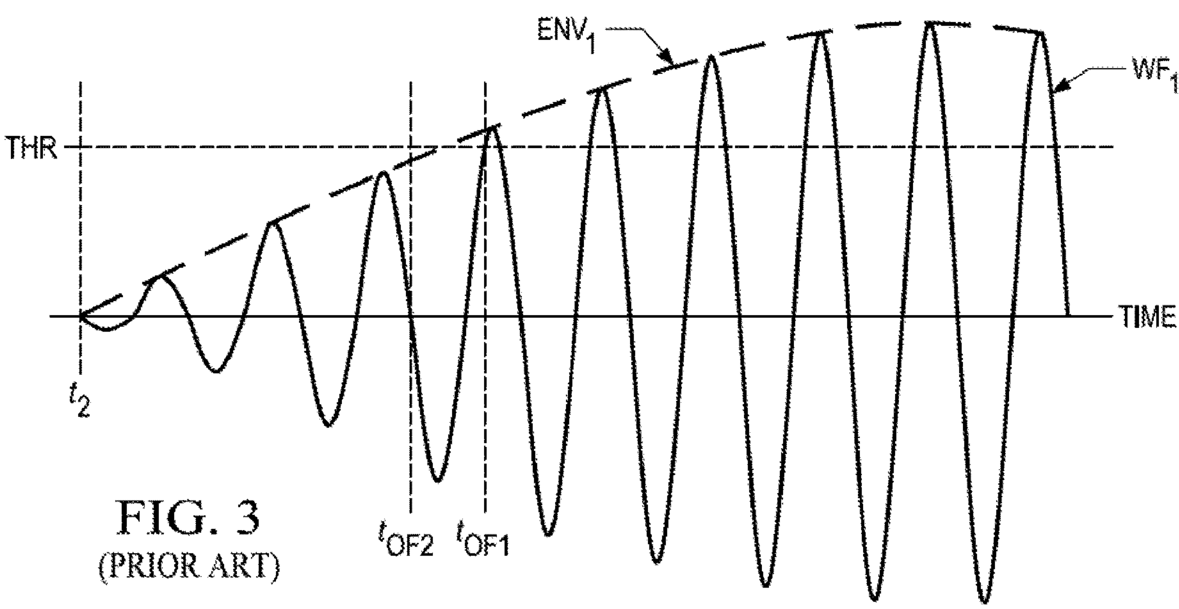
FIG. 3 illustrates a prior art received echo waveform evaluated for when an envelope of the signal amplitude reaches a threshold.
Figure 4:
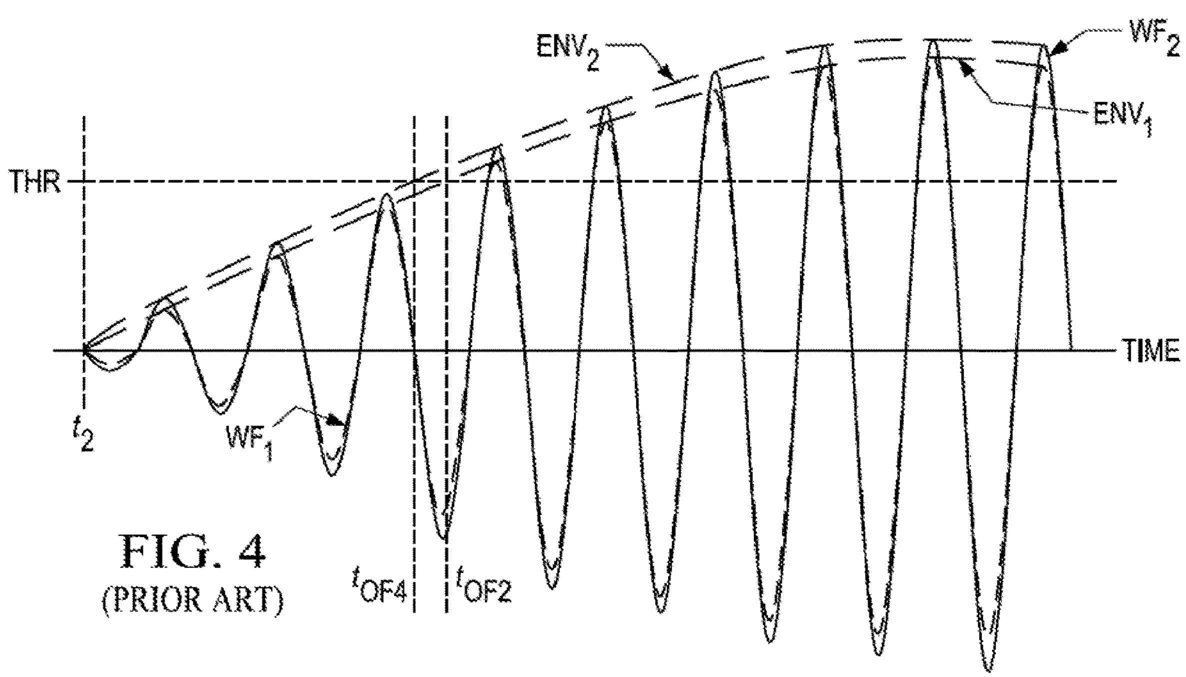
FIG. 4 illustrates a prior art received echo waveform evaluated for when an envelope of the signal amplitude reaches a threshold, wherein successive instances of the echo waveform have differing envelopes.
Figure 6:
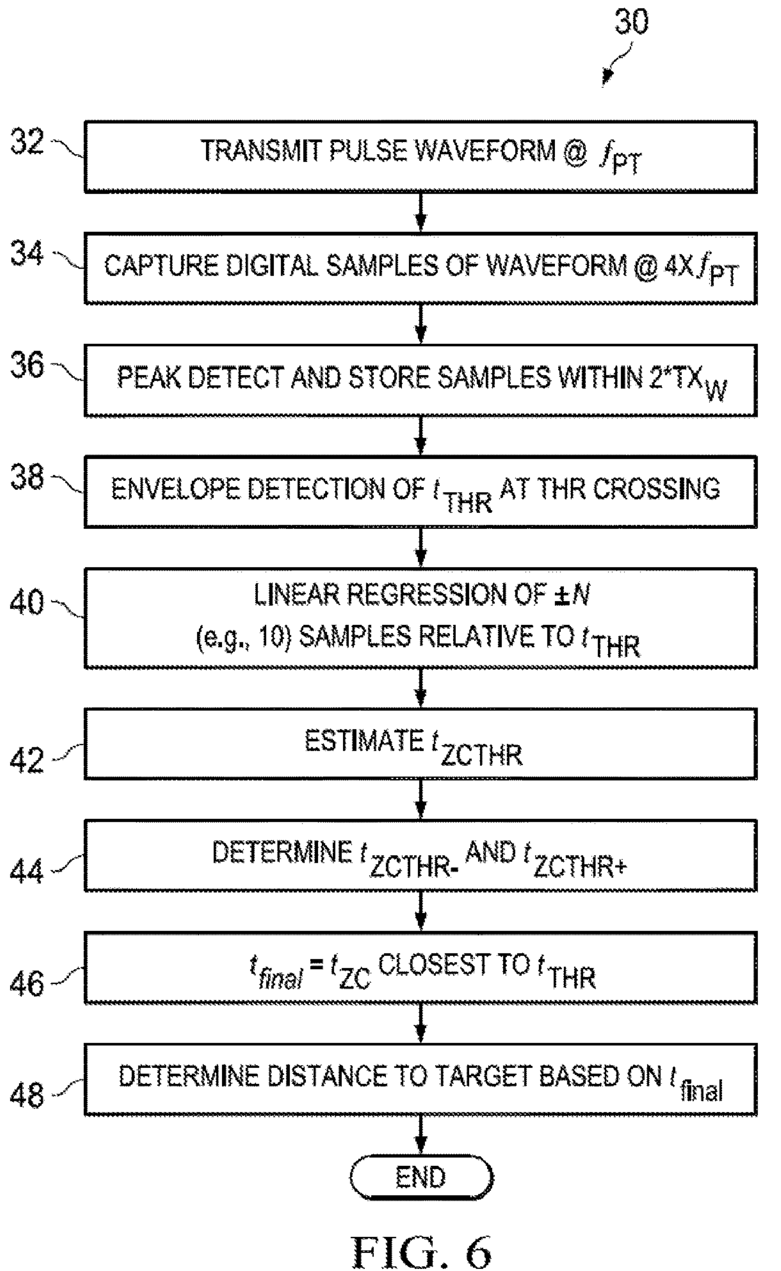
FIG. 6 illustrates a flowchart of a method of operation of the system from FIG. 5.
Figure 7:
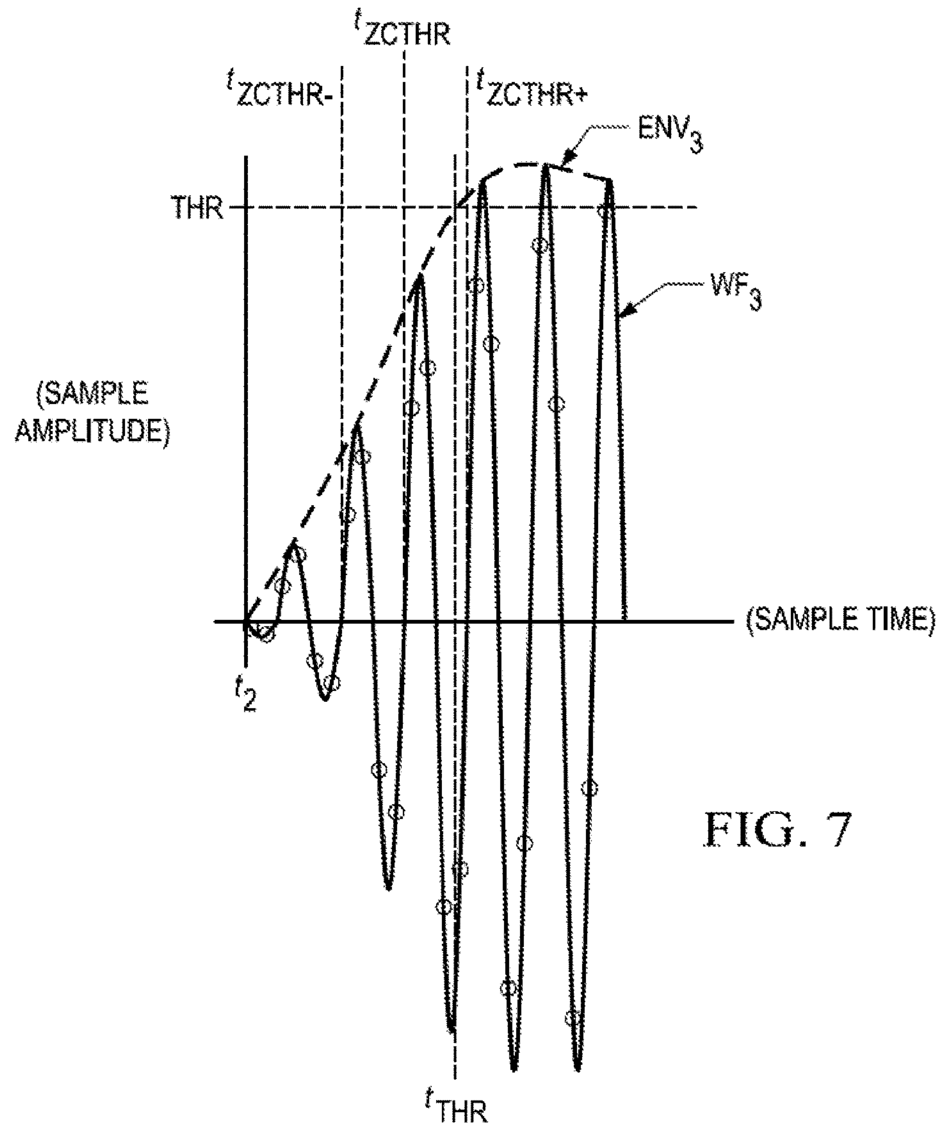
FIG. 7 illustrates a sampled reflected echo waveform according to a preferred embodiment and for which a waveform envelope is evaluated to detect when a threshold is reached.

FIG. 6 illustrates a flowchart of a method 30 of operation of processor 16 from system 10, as may be implemented with appropriate software instructions stored in or accessible by, and or via hardware/firmware of, processor 16, or any combination thereof. Method 30 commences with a step 32, where system 10 transmits an excitation pulse train such as shown in FIG. 1, where for reference the frequency of the pulses is referred to a $f_{PT}$. Thus, in system 10, processor 16 outputs the pulse train via GPIO, and it is optionally boosted by booster 18 and applied to the transmitting element T of transducer 12. In response, ultrasonic waves are directed toward target 14, and an echo waveform, also having a frequency of $f_{PT}$, is reflected back toward the receiving element R of transducer 12. For continuing discussion in this document, FIG. 7 illustrates such a reflected echo waveform $WF_3$, which as introduced earlier has an increasing amplitude for a period of time after which it will begin to decay. Next, method 30 continues to step 34.

In step 34, processor 16 captures digital values (i.e., samples) of the reflected waveform amplitude into on-chip or off-chip memory, preferably at an integer multiple IM of $f_{PT}$ so that IM samples are captured for each period of transmitted pulse; in one preferred embodiment, IM=4, so the sampling frequency, $f_S$, for step 34 is $4*f_{PT}$. In FIG. 7, therefore, for each $2\pi$ period of the generally sine wave shape of waveform $WF_3$, four circles are shown along each $2\pi$ wave period, each intending to illustrate a respective one of four samples captured during that period and per step 34. Note that for each digital captured sample amplitude, also stored is the timing of the sample. Such timing may be determined by a count either of processor clock cycles or by a sequentially incrementing number of samples captured, as knowledge of the number of a sample necessarily can provide the timing of the sample by multiplying the sample number times the sample period, $T_S=1/f_S$. Next, method 30 continues to step 36.

In step 36, the peak of the received samples is identified as the sample indicating the largest amplitude (i.e., largest absolute value), where a later discussion indicates the determination of amplitude given a sample value. Once the peak is identified, a number of samples within a time window centered about the time of the detected peak are retained (e.g., in memory) for processing. The width of the time window may be selected by one skilled in the art. For example, in one preferred embodiment, the time window equals twice the length of time, $T_W$, to transmit the pulses in step 32 (e.g., from $t_0$ to $t_1$ in FIG. 1). Next, method 30 continues to step 38.

In step 38, a waveform envelope, shown by way of example in FIG. 7 as envelope $ENV_3$, is determined from the stored data samples remaining after step 36. As shown graphically in FIG. 7, such an envelope generally represents a relatively smooth curve passing in proximity to the peak amplitude for each $2\pi$ period of waveform $WF_3$. Various techniques may be selected for determining envelope $ENV_3$, where as detailed later, in a preferred embodiment one method is to filter each sample as real data to provide an imaginary counterpart (e.g., I and Q data, respectively), and then trigonometry is used to determine an approximate sine wave amplitude in response. Further in step 38, in addition to determining the envelope, detection is made of the time (either clock time or sample time) when the envelope $ENV_3$ crosses a threshold THR, as illustrated in FIG. 7 to occur at a time $t_{THR}$. The value of the threshold THR may be selected by one skilled in the art, such as at ½ the peak amplitude determined in step 36; for sake of illustrative purposes, however, in FIG. 7 the threshold THR is shown larger than ½ of the peak, so as to facilitate the remaining discussing of inventive aspects. Next, method 30 continues to step 40.

In step 40, a linear regression is performed to determine the phase of ±N step 34 (or step 36) samples, where those samples occurred relative to the time when the step 38 peak was determined. In one preferred embodiment N=10, so the phase is determined on 10 samples before $t_{THR}$ and the phase is determined on 10 samples after $t_{THR}$. Various techniques for determining phase also may be selected by one skilled in the art, and as introduced earlier where I and Q data are generated for each sample, then in that instance trigonometry also may be used to determine phase for each sample, as also detailed later. Thus, for each of the N samples, known or determined are its sample time $st_x$ and its respective phase $\theta S$, which may be represented by a coordinate pair of its sample time and phase thereby creating a sample set with 2N coordinates, as $[(st_0, \theta S_0), (st_1, \theta S_1), \ldots (st_{2N}, \theta S_{2N-1})$. In general, for a sinusoid of either fixed or varying amplitude, the wave may be described by the following Equation 1:

$$\text{amplitude} = A\sin(\theta S) = A\sin(2\pi(f)(st) + \phi) \qquad \text{Equation 1}$$

where,

A is the peak amplitude, $\theta S$ is the phase of a sample, f is the frequency of the waveform, which here is the same as the frequency, $f_{PT}$, of the originally transmitted pulses;

st is sample time; and $\phi$ is the phase offset (i.e., y-axis intercept).

Figure 8:
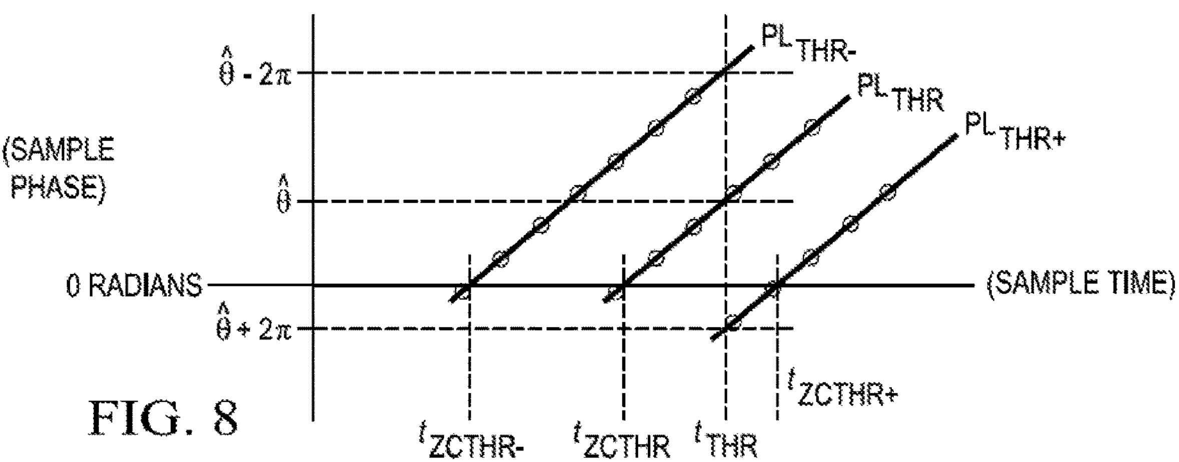
FIG. 8 illustrates a plot of phase versus time of a linear regression fit for three lines corresponding to respective 2π periods of the waveform of FIG. 7.

Note, therefore, that the parenthetical of $(2\pi(f)(st)+\phi)$ in Equation 1 is a line (i.e., typically referred to in geometry as y=mx+b) having slope of $m=2\pi f$ and a y-intercept of $b=\phi$. In this regard, therefore, and by definition, linear regression will model or fit a line to the phase of the sampled data and matching the parenthetical of Equation 1, depicting the increasing phase, among the 2N (e.g., 20) samples. In this regard, FIG. 8 illustrates a plot of sample phase along the vertical axis and sample time along the horizontal axis, with a first phase line $PL_{THR}$ that results from the above-described linear regression. Thus, from samples shown also in FIG. 8 by way of circles both before and after time $t_{THR}$, line phase line $PL_{THR}$ is best fit to those samples, although to simplify the drawing only six samples are shown, rather than 20. Since phase and time are known for each sample in the set, then this line may be defined and extrapolated as desired, for example to provide the phase offset $\phi$ (i.e., y-axis intercept). Note therefore that while a sample may not have occurred at time $t_{THR}$ since that time is detected from an envelope amplitude, rather than a single sample amplitude, exceeding a threshold THR, then the line $PL_{THR}$ thereby estimates phase and timing other than at the finite sample times. Thus, an estimated phase $\hat{\theta}$ can be determined from the line $PL_{THR}$ as of the time $t_{THR}$. In addition, therefore, the line $PL_{THR}$ also indicates phase and timing for other points along the line, as will be useful as further described below. Next, method 30 continues to step 42.

In step 42, processor 16 estimates a time of the zero-phase crossing of waveform $WF_3$ that corresponds to the ±N data samples closest to time $t_{THR}$. Thus, looking to FIG. 7, where time $t_{THR}$ occurs during a $2\pi$ period for waveform $WF_3$, then step 42 attempts to determine the time $t_{ZCTHR}$ of the zero phase crossing that occurred at the beginning of the $2\pi$ period during which $t_{THR}$ occurred. In a preferred embodiment, step 42 is accomplished using the linear regression result from step 40, as is further appreciated with respect to FIG. 8. Specifically, recall that step 42 produced line $PL_{THR}$, a linear fit to phase data of the ±N data samples closest to time $t_{THR}$. As a result, this line extends to and intersects with the 0 radian axis, that is, where the estimated phase $\hat{\theta}$ equals zero. Graphically and computationally, therefore, the zero crossing of the phase axis (i.e., when phase equals 0) may be determined given Equation 1 as modeled by line $PL_{THR}$, namely, by rearranging the parenthetical of Equation 1 as shown in the following Equation 2:

$$0 = (2\pi(f_{PT})(st) + \phi) \qquad \text{Equation 2}$$

Rearranging Equation 2 to solve for the time when the zero crossing occurs gives the following Equation 3:

$$\frac{-\phi}{2\pi(f_{PT})} = t_{ZCTHR} \quad \text{Equation 3}$$

Given the preceding, note that $t_{ZCTHR}$ provides a reference time relative to waveform $WF_3$, where that reference relates to phase (i.e., as defined by zero-crossing) of the waveform $WF_3$, rather than solely to its amplitude. In this manner, therefore, a preferred embodiment may calculate TOF as to this reference time, and thereafter distance is a straightforward relationship to rate (i.e., speed of sound) times TOF. The distance measurement therefore is responsive to a phase-related timing as between successive received echo waveforms, that is, so long as the target 14 is not moving, while the amplitude of successive echo waveforms may vary, the phase as between such successive echo waveforms is typically constant, absent any disturbance or change in the channel between transducer 12 and target 14. Thus, the preferred embodiment, in determining distance based on phase, is more accurate than prior art, amplitude-detecting-only, schemes. Moreover, in the preferred embodiment the echo waveform is efficiently created from a single frequency transmission of a pulse train. Still further, and as detailed below, an additional aspect of a preferred embodiment can incorporate still further considerations so as to reduce the chance of phase (or cycle) slip, further improving the accuracy of the resultant distance measurement, as is accomplished as shown in remaining steps in method 30, which next proceeds to step 44.

It is recognized in connection with a preferred embodiment that cycle slip may occur as between successively-received echo waveforms, that is, an erroneous detection of a single cycle away from the actual cycle in which the threshold is exceeded corresponds to one wavelength in error measurement; for example, for 40 kHz, one wavelength (i.e., λ) is 8.5 mm, so a cycle slip of a single cycle will result in a distance calculation error of 8.5 mm, which is a very large error for high resolution systems. Such an error is more likely to occur in prior art where envelope detectors are used to evaluate the reaching of a threshold. In contrast, therefore, the preferred embodiment, by identifying a zero crossing as revealed by the phase of the echo waveform, can detect changes in distance to the target as low as fractions of the wavelength λ, thereby providing the ability to detect movement down to the 100 um levels, meaning the preferred embodiment can detect very small shifts in target distance, as low as 1/85th of the wavelength, for example. This is traditionally not achievable using envelope methods, since changes in envelope at such small displacements are usually not a very robust indicator, whereas the preferred embodiment can capture such changes by evaluating relative to phase variations, rather than amplitude envelope variations. In this regard, step 44 is directed at reducing the chance for cycle slip, as may occur if $t_{THR}$ was particularly close to the 2π period of the echo waveform immediately before the period in which $t_{THR}$ occurred, or likewise if $t_{THR}$ was particularly close to the 2π period of the echo waveform immediately after the period in which $t_{THR}$ occurred. To mitigate the possibility of cycle slip, step 44 determines two additional zero crossing times, one designated as $t_{ZCTHR-}$ as the zero crossing for the 2π period of the echo waveform immediately before the period in which $t_{THR}$ occurred, and one designated as $t_{ZCTHR+}$ as the zero crossing for the 2π period of the echo waveform immediately after the period in which $t_{THR}$ occurred. In one preferred embodiment, these two additional two zero crossings are readily achievable given line $PL_{THR}$ in FIG. 8, as $t_{ZCTHR-}$ will occur at one period earlier of the echo waveform relative to $t_{ZCTHR}$, and $t_{ZCTHR+}$ will occur at one period later of the echo waveform relative to $t_{ZCTHR}$. Thus, in FIG. 8, a phase line $PL_{THR-}$ is shown having a phase of 2π earlier than line $PL_{THR}$, and a phase line $PL_{THR+}$ is shown having a phase of 2π later than line $PL_{THR}$. Moreover, phase line $PL_{THR-}$ therefore has a respective zero crossing as $t_{ZCTHR-}$, and phase line $PL_{THR-}$ therefore has a respective zero crossing as $t_{ZCTHR+}$. Next, method 30 continues to step 46.

Step 46 determines a final reference time $t_{final}$ to be used as the time reference to determine TOF for the determination of distance between transducer 12 and target 14. Thus, whereas earlier in connection with step 42 it was noted that $t_{ZCTHR}$ may be used for such a time reference, step 46 provides an alternative whereby one of either $t_{ZCTHR-}$, $t_{ZCTHR}$, or $t_{ZCTHR+}$, is selected as that reference time, so as to reduce the chance of cycle slip. In one preferred embodiment, this selection of reference time is as follows.

It is noted that trim is not likely to occur exactly at a time of a sample, so in terms of sample time (i.e., an integer multiple of the time when a sample is taken), then $t_{THR}$ is a fractional value, that is, some non-integer multiple of sample time. Hence, to improve the fractional delay part of $t_{THR}$ toward a final time reference to determine TOF, a preferred embodiment determines the fractional delay portion, $t_{THR\text{-}frac}$, of $t_{THR}$, according to the following Equation 4:

$$t_{THRfrac} = t_{THR} - roun(t_{THR}) \quad \text{Equation 4}$$

Next, the preferred embodiment calculates the time difference between the fractional delays derived from the envelope and phase, so as to improve robustness of the fractional delay computation to mitigate cycle slips due to 2π uncertainty in phase. This sub-step determines if the envelope time crossing at time $t_{THR}$ falls within the same 0 to 2π radians of the waveform $WF_3$ period when $t_{THR}$ occurred, or if it was closer to the immediately-preceding 2π cycle or to the immediately-following 2π cycle, depending on when the trim crossing happened. Hence, three differential values are determined, as shown in the following Equations 5 through 7:

$$\Delta t_{ZCTHR-} = t_{THRfrac} - t_{ZCTHR-} \quad \text{Equation 5}$$

$$\Delta t_{ZCTHR} = t_{THRfrac} - t_{ZCTHR} \quad \text{Equation 6}$$

$$\Delta t_{ZCTHR+} = t_{THRfrac} - t_{ZCTHR+} \quad \text{Equation 7}$$

Next, the preferred embodiment selects from the results of Equations 5 through 7 the one fractional delay estimate from phase that is closest to the fractional delay estimate from the envelope, as shown in the following Equation 8, selecting the minimum of the absolute values listed therein:

$$t_{fracfinal} = \min[\mathrm{abs}(\Delta t_{ZCTHR-}, \Delta t_{ZCTHR}, \Delta t_{ZCTHR+})] \quad \text{Equation 8}$$

Finally, the preferred embodiment computes the final absolute time reference for use in the TOF determination by correcting the original trim estimate (from when the envelope waveform reached threshold THR) with the newer estimate, as shown in Equation 9:

$$t_{final} = t_{THR} - t_{fracfinal} \quad \text{Equation 9}$$

Given the results of Equation 9, step 48 determines the distance from transducer 12 to target 14 using $t_{final}$ as the ultimate timing reference, again in that distance relates to TOF and the speed of sound, as shown in the following Equation 10:

$$\text{target distance} = (t_{final} - t_0) * c/2 \qquad \text{Equation 10}$$

where, $t_0$ is the time when the pulse train began transmission (see FIG. 1); and c is the speed of sound.

Note also that the calculation may include some offset from the result of this product because the detected time reference is not the beginning of the echo waveform ($t_2$ in FIG. 1), where the offset can be removed as a constant bias (i.e., calibration constant). Note also that any other potential cycle slips due to noise can be cleaned up by using a 3/N-tap median filter at the cost of latency, as the application demands.

Figure 9:
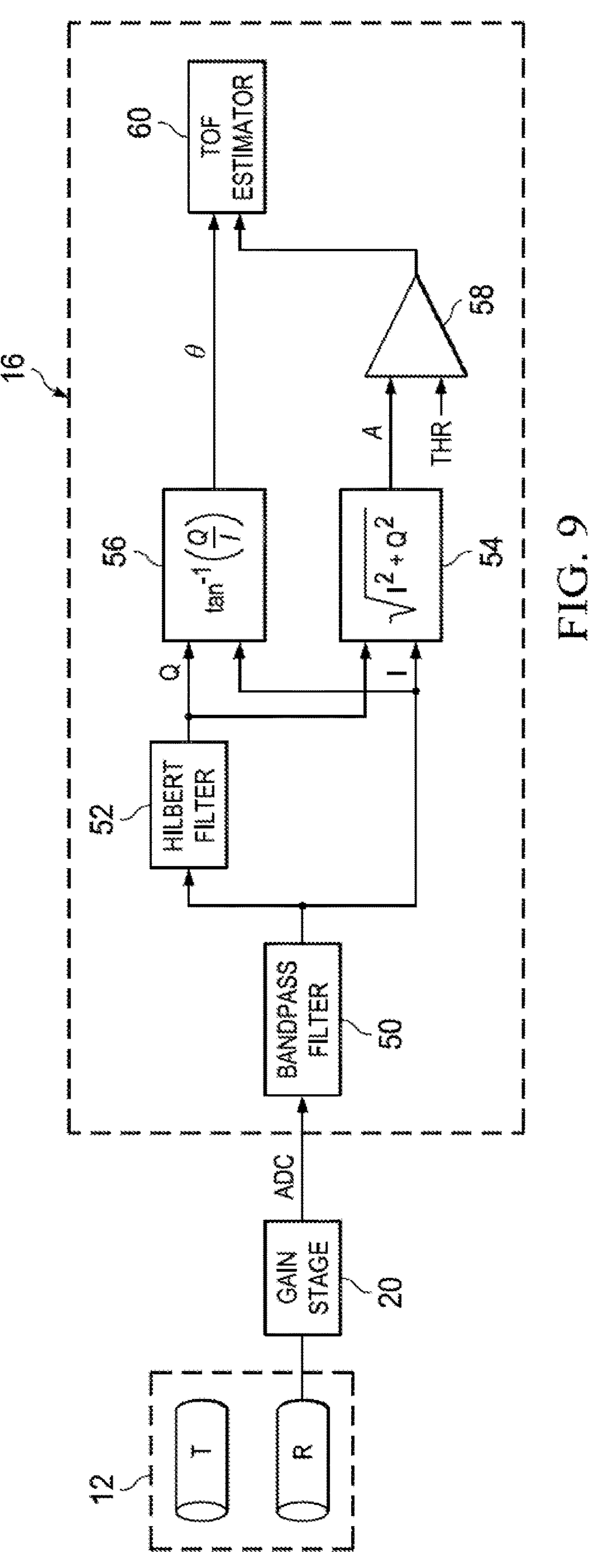
FIG. 9 illustrates a functional block diagram to summarize preferred embodiment implementation details.

FIG. 9 illustrates a functional block diagram to summarize various of the above teachings and to complete various additional detail as to certain preferred embodiment implementation details. In general, therefore, FIG. 9 again illustrates, from FIG. 5, transducer 12 and the receiver portion communicating a signal to gain stage 20, where recall the signal is amplified and converted from analog to digital and connected to processor 16. In FIG. 9, processor 16 is shown in dashed outline, so as to further illustrate various computational functions that may be implemented by software programming and/or hardware on processor 16, either alone or in conjunction with other devices communicating with processor 16.

Turning to the functionality achieved in processor 16 so as to perform method 30 of FIG. 6, a digital bandpass filter 50 processes the received signal so as to eliminate noise beyond certain frequencies, based on the expected operating frequency bandwidth of transducer 12. For example, bandpass filter 50 may filter the signal so as to pass the pulse waveform frequency $f_{PT}\pm 2$ kHz. The filtered signal therefore provides a real component, which is treated as the I data of the eventual I/Q data pair. This real data, I, is coupled to a Hilbert filter 52 (or other discrete Fourier transformation) to convert the real signal to I/Q data, that is, to provide the Q data counterpart. Both the I data (from bandpass filter 50) and the Q data (from Hilbert filter 52) are connected to an amplitude determination block 54 and a phase angle detection block 56. For each sample (I,Q), amplitude determination block 54 determines the amplitude A (in Equation 1) given an understanding of phase vectors in the complex plane, whereby the Pythagoras equation shown in FIG. 9 determines the wave amplitude as the hypotenuse length given the sampled size of I and Q. Note, therefore, that this amplitude provides a measure of envelope $ENV_3$ in FIG. 7, as the amplitude rises with the increase of the sine wave amplitude (and likewise later decays). Thus, this amplitude is connected as one input to a comparator 58, which compares that amplitude to its second input, the threshold THR value, so as to achieve step 38 in FIG. 6. At the same time, also for each sample (I,Q), phase angle detection block 56 determines the momentary phase θ (in Equation 1) based on the arctangent of Q relative to I. Thus, for each sample (I,Q), the sample time $st_x$ of the sample is known and the respective momentary phase $\theta_x$ is determined, thereby providing the above discussed sample set with 2N coordinates, as $[(st_0, \theta S_0), (st_1, \theta S_1), \ldots (st_{2N}, \theta S_{2N-1})$. With this information, the remaining steps 40 through 46 of FIG. 6 may be accomplished by a TOF estimator 60, from which a distance determination may be concluded per step 48 of FIG. 6.

From the above, the preferred embodiments are shown to provide a an improved ultrasonic transducer system and method for ultrasound time of flight (TOF) measurement and the resultant distance determination therefrom. The preferred embodiments have been shown in a favorable implementation with respect to distance detection, but note numerous aspects may apply to other systems that render additional processing from the TOF information. In view of the above, therefore, while various alternatives have been provided according to the disclosed embodiments, still others are contemplated and yet others can be ascertained by one skilled in the art. Given the preceding, therefore, one skilled in the art should further appreciate that while some embodiments have been described in detail, various substitutions, modifications or alterations can be made to the descriptions set forth above without departing from the inventive scope, as is defined by the following claims.

The invention claimed is:

1. A method comprising:

receiving a set of non-zero samples associated with multiple cycles of a signal, in which multiple non-zero samples are received for each cycle of the signal;

determining a threshold crossing time based on an amplitude envelope of the signal crossing a threshold;

determining a zero phase time of a zero crossing of the signal based on the threshold crossing time and phases of at least a subset of the set of samples and times of the phases; and determining a time of flight associated with the signal based on the zero phase time.

2. The method of claim 1, wherein the time of flight is between a transmission time associated with a set of pulses used to excite a transducer and a reference time based on the zero phase time.

3. The method of claim 2, wherein the transmission time is a time of a first pulse transition in the set of pulses.

4. The method of claim 2 further comprising providing the set of pulses to the transducer.

5. The method of claim 1 further comprising: converting each sample of the set of samples into an (I,Q) sample pair, and determining the phase of each sample in the subset based on the respective (I,Q) sample pair.

6. The method of claim 1, wherein:

the signal is an echo waveform is associated with a target; and the method further includes determining a distance between a transducer and the target based on the time of flight.

7. The method of claim 1, further comprising determining a relationship between the phases and the times of the phases, wherein determining a zero phase time includes determining the zero phase time based on the relationship.

8. The method of claim 1, further comprising:

identifying the at least the subset of the set of samples based on the threshold crossing time.

9. The method of claim 8 further comprising converting each sample of the set of samples into an (I,Q) sample pair, wherein the determining of the amplitude envelope of the signal is based a square root of a square of the respective (I,Q) sample pair of each sample in the set of samples.

10. The method of claim 8, further comprising determining a reference time based on the zero phase time.

11. The method of claim 10, wherein determining the zero phase time includes determining whether the threshold crossing time is closer to: a first zero phase crossing time in a same cycle of the signal as the threshold crossing time, a second zero phase crossing time in a cycle of the signal prior to the threshold crossing time, or a third zero phase crossing time in a cycle of the signal after the threshold crossing time.

12. The method of claim 10, further comprising determining a fractional portion of the threshold crossing time based on a difference between the threshold crossing time and a time of a nearest sample of the set of samples, wherein the determining the zero phase time includes determining, based on the fractional portion of the threshold crossing time, whether the threshold crossing time is closer to: a first zero phase crossing time in a same cycle as the threshold crossing time, a second zero phase crossing time in a cycle of the signal prior to the threshold crossing time, or a third zero phase crossing time in a cycle of the signal after the threshold crossing time.

13. The method of claim 7, wherein determining a relationship between phases of at least a subset of the set of samples with time includes determining the relationship between respective phases of each sample of the at least a subset of the set of samples with time.

14. A system comprising:

an analog-to-digital converter configurable to receive a signal, sample the signal at a sampling rate higher than a frequency of the signal, and generate a set of non-zero samples of the signal, in which multiple samples are generated for each cycle of the signal; and a processor coupled to the analog-to-digital converter and configured to:

determine a threshold crossing time based on an amplitude envelope of the signal crossing a threshold;

determine a zero phase time of a zero crossing of the signal based on the threshold crossing time and phases of at least a subset of the set of samples and times of the phases; and determine a time of flight associated with the signal based on the zero phase time.

15. The system of claim 14, wherein the time of flight is between a transmission time associated with a set of pulses used to excite a transducer and a reference time based on the zero phase time.

16. The system of claim 15, wherein the transmission time is a time of a first pulse transition in the set of pulses.

17. The system of claim 15 further comprising a transceiver that includes:

the transducer coupled to the processor, wherein the processor is configured to provide the set of pulses to the transducer; and a receiver coupled to the analog-to-digital converter to provide the signal.

18. The system of claim 14, wherein the processor includes:

a bandpass filter coupled to the analog-to-digital converter and configurable to:

receive the set of samples; and provide, for each sample of the set of samples, an in-phase component of an (I,Q) sample pair;

a Hilbert filter coupled to the bandpass filter and configurable to provide for each sample of the set of samples, quadrature component of the (I,Q) sample pair; and a phase angle detection block coupled to the bandpass filter and to the Hilbert filter and configurable to determine the phase of each sample in the subset based on the respective (I,Q) sample pair.

19. The system of claim 14, wherein:

the signal is an echo waveform associated with a target; and the processor is configured to determine a distance between a transducer and the target based on the time of flight.

20. The system of claim 14, wherein the processor is configured to determine a reference time based on the zero phase time.

21. The system of claim 20, wherein the processor is configured to determine the zero phase time based on determining whether the threshold crossing time is closer to: a first zero phase crossing time in a same cycle of the signal as the threshold crossing time, a second zero phase crossing time in a cycle of the signal prior to the threshold crossing time, or a third zero phase crossing time in a cycle of the signal after the threshold crossing time.

22. The system of claim 20, wherein the processor is configured to determine the zero phase time based on:

determining a fractional portion of the threshold crossing time based on a difference between the threshold crossing time and a time of a nearest sample of the set of samples; and determining, based on the fractional portion of the threshold crossing time, whether the threshold crossing time is closer to: a first zero phase crossing time in a same cycle of the signal as the threshold crossing time, a second zero phase crossing time in a cycle of the signal prior to the threshold crossing time, or a third zero phase crossing time in a cycle of the signal after the threshold crossing time.

23. The system of claim 14, wherein the processor is configured to determine a relationship between the phases and the times of the phases and determine the zero phase time based on the relationship.

24. The system of claim 14, wherein the processor is configured to:

identify the subset of the set of samples based on the threshold crossing time.

25. The system of claim 24, wherein the processor includes:

a bandpass filter coupled to the analog-to-digital converter and configurable to:

receive the set of samples; and provide, for each sample of the set of samples, an in-phase component of an (I,Q) sample pair; and a Hilbert filter coupled to the bandpass filter and configurable to provide for each sample of the set of samples, quadrature component of the (I,Q) sample pair; and an amplitude detection block coupled to the bandpass filter and to the Hilbert filter and configurable to determine the amplitude envelope based on the (I,Q) sample pairs of the set of samples.

26. The system of claim 23, wherein the processor is configured to determine the relationship based on determining a relationship between respective phases of each sample of the at least a subset of the set of samples with time.

* * * * *